(No Model.)

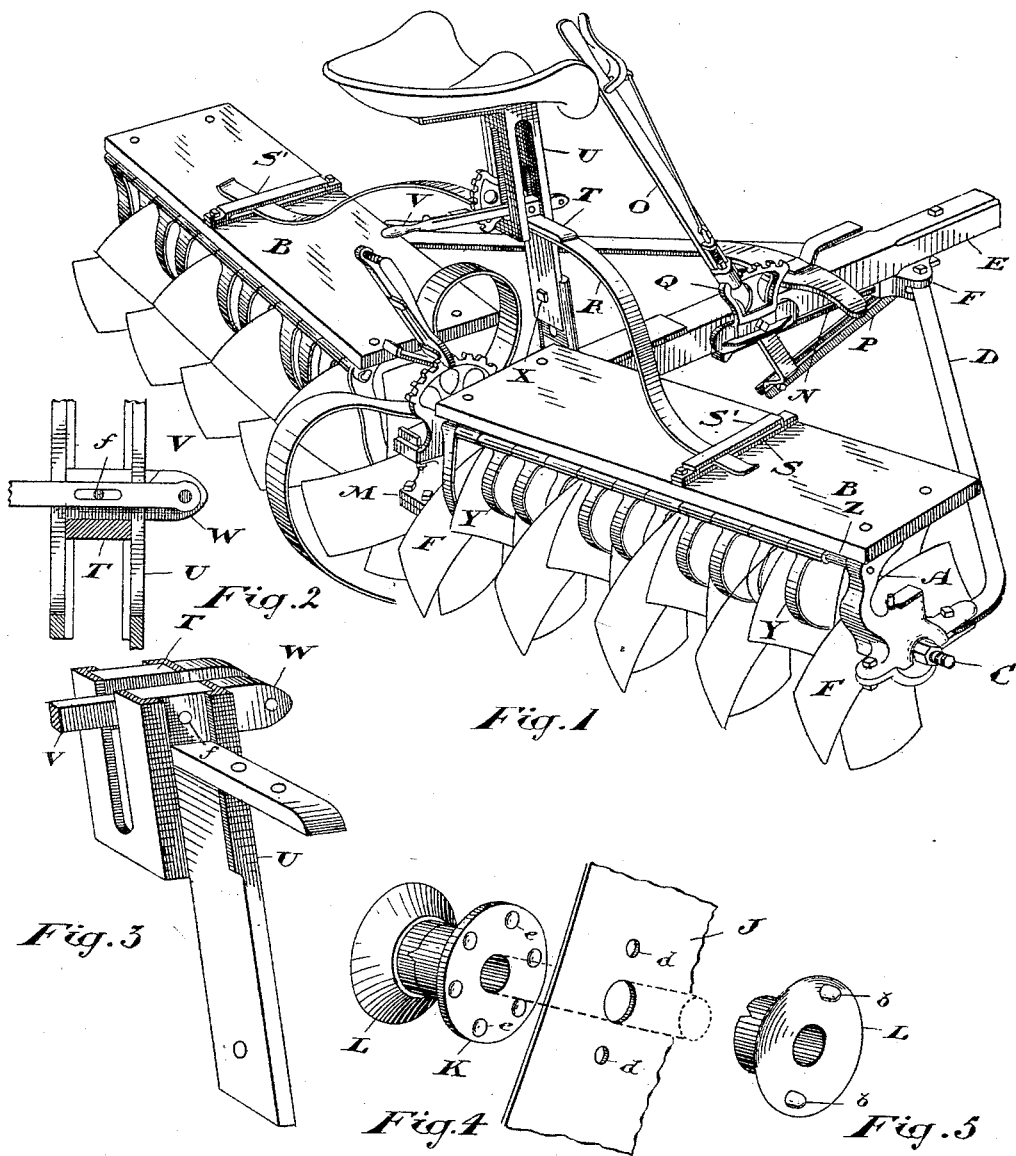

J. DRADER & A. B. McKAY.
ROTARY PLOW.

No. 450,714. Patented Apr. 21, 1891.

Witnesses

Inventors
Joseph Drader
A. B. McKay
by Donald C. Ridout & Co.
Attys.

UNITED STATES PATENT OFFICE.

JOSEPH DRADER AND ANDREW B. McKAY, OF LONDON, CANADA; SAID McKAY ASSIGNOR TO SAID DRADER.

ROTARY PLOW.

SPECIFICATION forming part of Letters Patent No. 450,714, dated April 21, 1891.

Application filed July 2, 1890. Serial No. 357,510. (No model.)

*To all whom it may concern:*

Be it known that we, JOSEPH DRADER and ANDREW BEAN McKAY, both manufacturers, and both of the city of London, in the county of Middlesex, in the Province of Ontario, Canada, have jointly invented a certain new and useful Improvement in Rotary Plows, of which the following is a specification.

The invention relates to certain new and useful improvements made upon a rotary plow patented in the United States on the 24th September, 1889, under No. 411,650, and in Canada on the 2d November, 1889, under No. 32,661, by Joseph Drader, one of the parties of this application.

The object of the present invention is, first, to arrange the outer bearing of each plow-spindle in such a manner that the draft from the tongue of the machine will not twist the said bearing; secondly, to improve the mechanism by which the driver is enabled to increase or decrease the pressure on the inner or outer ends of the plow-spindle; thirdly, to improve the means for connecting together the blades forming the plow; fourthly, to improve the inner and outer bearings of each plow-spindle, and, fifthly, to improve the means for angling the two gangs of curved blades forming the plow.

This invention relates to an improvement in rotary plows; and it consists in the peculiar construction, arrangement, and combinations of parts hereinafter more particularly described, and then definitely claimed.

Figure 6:
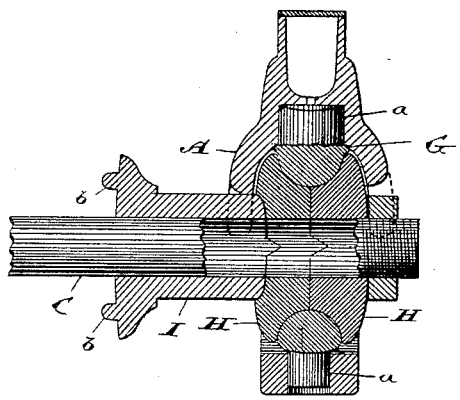
Figure 7:
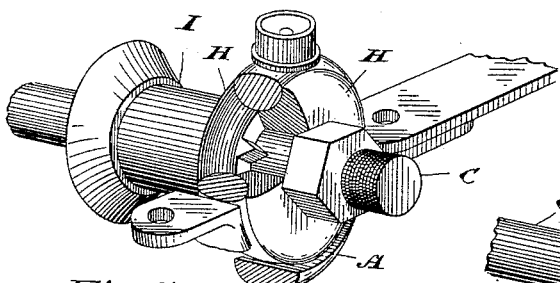
Figure 8:
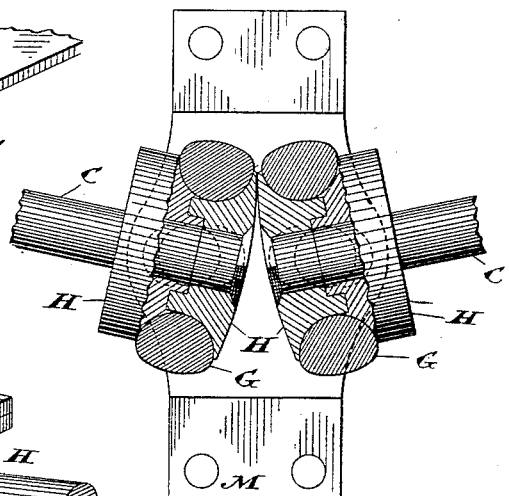
Figure 9:
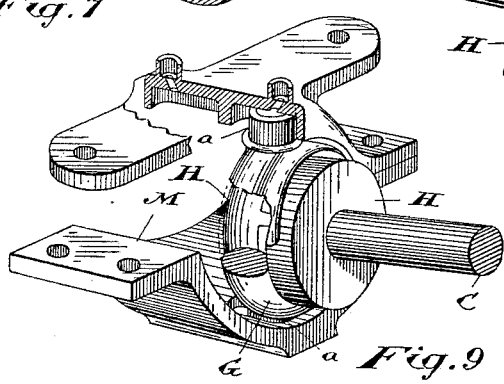

In the accompanying drawings, Figure 1 is a perspective view of the improved rotary plow. Figs. 2 and 3 are enlarged sectional details showing the connection between the semi-elliptical springs and seat-standard. Figs. 4 and 5 are details of the ferrules by which the blades are held in position. Figs. 6 and 7 are details of the outer bearing-box. Figs. 8 and 9 are details of the inner bearing-box.

As indicated by Fig. 1, the rotary plow on which our improvement has been made consists of two gangs of curved blades, each gang being supported on a spindle, the inner ends of which are journaled in a bearing-box fixed to the tongue, while the outer end of each of the said spindles is held by a diagonal brace connected to a block adjustably connected on the said tongue. The draft on the tongue is consequently directed at an angle upon the outer bearing of each spindle, which in the Drader plow, upon which ours is an improvement, causes the said outer bearing to twist and thus wear unevenly. In our construction we form the bearing-box in a bracket A, rigidly fixed to the board B, which is supported above the plow-spindle C, as indicated in Fig. 1. The diagonal brace D is pivoted on the bracket A and extends toward the tongue E, where it is connected to a block F. The bearing-box of the spindle C is composed of a ring G, provided with two trunnions $a$, which are fitted into circular holes made in the bracket A. The upper trunnion is made hollow to form an oil-box, as indicated in Figs. 6 and 7, so as to admit oil through the ring G onto the wearing-surface of the washers H, which are shaped, as indicated in Fig. 6, to fit the interior surface of the ring G. A pair of washers are provided for each bearing, as indicated, and are connected together by a V projection formed on one of the washers and fitting into a V-notch formed in the other washer. A sleeve I (see Fig. 6) is fitted onto the spindle C, and is connected to the inner washer H by a V connection, as indicated. On the inner end of the sleeve I we form two teats $b$, which are intended to hold one of the curved plates J. Each plate J has two holes $d$ made in it, through which the teats $b$ pass and fit into any two of the holes $e$ in the ferrule K. A ferrule L is secured to the ferrule K by the V-shaped connection, (indicated in Fig. 4,) and teats $b$ are made in the opposite end of the ferrule L, (see Fig. 5,) which teats pass through holes in the curved blade, abutting against it and into holes made in the next ferrule K, and so on, each curved plate J being held between two ferrules like K and L, except the outer end plate, which is held between the sleeve I and the ferrule K. The inner bearing of each spindle C is formed in the same way as its outer bearing, the only difference being that both bearings are held in a single bracket M, which is fixed to the tongue E. The block F is grooved to fit onto a plate N, fixed to the tongue E, and is connected to the hand-lever O by the link P, as indicated in Fig. 1. The lever O is pivoted on the tongue E and works in connection with a notched quadrant Q, as indicated in Fig. 1. It will be observed that by the movement of the lever O the angle of the two gangs of blades forming the plow may be readily altered.

R is a semi-elliptical spring the ends of which pass between two plates S, fixed to the top of the board B, as shown. The center of the spring R is connected to or passes below a block T, which is movably held within the seat-standard U, as indicated in Figs. 1, 2, and 3. The lever V is pivoted on a lug W, formed on the standard U, and is connected to the block T by a pin $f$, fixed to the block T and passing through an elongated hole in the lever V, as shown in Fig. 2. The lever V works in connection with a notched quadrant, as indicated in Fig. 1, and it will be seen on reference to that figure that by pressing the lever down the pressure on the plow may be increased and directed toward the outer end of each gang, or by raising the lever the pressure on the outer ends of the plow may be relieved. This portion of our invention will perhaps be better understood if we explain that when the harrow is used on soft ground the inner blades of the plow are apt to sink too far. It then becomes necessary to relieve the center of the plow from a portion of the driver's weight, and this is effected by forcing the spring down so as to distribute the weight over the outer blades of the plow. In very hard ground the center of the plow is apt to buckle up, owing to the action of the blades on the ground. It then becomes necessary to relieve the outer ends of the plow from the weight of the driver, and in some cases it even becomes necessary to direct a portion of the weight of the outer ends of the plow onto its center. This is effected by raising the lever sufficiently far to cause the ends of the spring R to act upon the upper plates S'. As the stroke of the lever V may not in itself be sufficient to effect the desired purpose, we make the seat-standard U adjustable, as indicated in Fig. 1. This is effected, as shown, by dividing it into two parts and connecting the two parts by a bolt X, which, when its nut is loosened, may be adjusted in a vertical slot made in one of the halves. We should also mention that instead of connecting the lever V to the block T by a pin $f$, as described, the said lever may be passed through a slot made in the said block T, which arrangement will accomplish the same purpose as the pin. The curved scrapers Y act in the same way as the curved scrapers described in Drader's patent, hereinbefore referred to; but instead of supporting them on a bar located behind the blades, which bar it was found interfered with the satisfactory working of the machine, we suspend them on a bar Z, suitably supported below the board B, and in order to make them adjustable we place thick and thin washers between each pair of scrapers, so that their position may be readily adjusted as much as required by removing and replacing the said washers.

What we claim as our invention is—

1. A semi-elliptical spring arranged transversely of the plow, the opposite ends of which rest on the top of the opposite boards connected to the spindles of the machine, in combination with a lever pivoted on the seat-standard and arranged to compress the said semi-elliptical spring for the purpose of directing pressure on the plow, substantially as and for the purpose specified.

2. A ferrule fitted onto the plow-spindle and having teats to project through holes made through the curved plow-blade and into holes formed in the face of a ferrule located on the opposite side of the said plow-blade, substantially as and for the purpose specified.

3. In an agricultural machine, a ring pivoted on a fixed bracket and held between two washers curved to fit the contour of the ring within which they fit, the said washers being connected to the plow-spindle and to each other, substantially as and for the purpose specified.

4. A semi-elliptical spring the ends of which are connected to the top of the board B between plates S and S', in combination with a lever pivoted on the seat-standard in such a manner that it may depress or elevate the ends of the said semi-elliptical spring, substantially as and for the purpose specified.

5. A semi-elliptical spring arranged transversely of the plow, the opposite ends of which rest on the top of the opposite boards B between plates S and S', in combination with a lever pivoted on the vertically-adjustable seat-standard in such a manner that it may depress or elevate the ends of the said semi-elliptical spring, substantially as and for the purpose specified.

London, Canada, June 20, 1890.

JOSEPH DRADER.
ANDREW B. McKAY.

In presence of—
W. H. WORTMAN,
T. H. LUSCOMBE.